July 15, 1947.　　　　L. HUDDLESTON　　　　2,424,172

ANIMAL BOOT

Filed Dec. 8, 1941

LON HUDDLESTON
INVENTOR

BY Hubert Miller

ATTORNEYS

Patented July 15, 1947

2,424,172

UNITED STATES PATENT OFFICE 2,424,172

ANIMAL BOOT

Lon Huddleston, Oklahoma City, Okla.

Application December 8, 1941, Serial No. 422,075

5 Claims. (Cl. 36—2.5)

This invention relates to an improved shoe or boot for claw footed animals, and is particularly adapted for use on dogs used for military purposes over rough country, as well as for hunting dogs.

It is well recognized that dogs which perform steady work over extended periods of time become so footsore as to be unfit for further service for days, or even weeks. Boots or shoes previously used have helped very little because they have been so ill-shapen and uncomfortable that they have injured the animal's feet almost as badly as lack of protection injured them. For military use, a highly trained dog is very valuable, and since it requires many months to properly train such dogs, it is a very serious matter to have one or more of them rendered unfit for service due to lack of foot protection.

It is the chief object of this invention, therefore, to provide a foot protector for animals, the foot fitting portion of which closely conforms to the anatomical structure of the splayed foot of the animal, and which allows the claws or nails of the animal to project therefrom in their normal positions. A boot as constructed has two very important advantages over presently used animal boots. In the first place, since the interior surface of the sole of the boot has depressions and ridges corresponding respectively to the raised pads and valleys on the bottom of the animal's foot, comfort is provided for the animal's foot, and there is no chafing or rubbing to cause corns or blisters. Secondly, since the invention contemplates that the sole of the boot will preferably be molded of a relatively soft yet tough, flexible material, such as rubber, and since the bottom surface of the sole is also preferably molded to correspond to the anatomical contours of the bottom of the animal's foot, the animal is provided with substantially the same foot traction as it has when the bottom of its foot actually contacts the ground. The traction of the boot is further enhanced by allowing the claws or nails of the animal to protrude from the interior thereof for actual contact with the ground.

The details in the construction of a preferred form of the invention, together with other objects attending its production, will be better understood from the following description when read in connection with the accompanying drawings, which are chosen for illustrative purposes only, and in which Fig. 1 is a perspective view of one preferred form of boot constructed in accordance with the invention, the boot being shown in position on the foot of a dog;

Like numerals designate like parts in all the figures.

According to the invention, the foot protector or boot has two main parts, namely the upper or leg fitting portion, or sheath designated as a whole by the numeral 6, and the lower or foot fitting portion, or socket, designated as a whole by the numeral 7. While I contemplate making the boot of any material which proves suitable, and while I recognize that it is entirely possible to make the upper and lower portions of the boot of two different materials, I prefer to make the entire boot of rubber. Such material is relatively easy to work with, can be molded easily and cured while in its molded form, is tough yet flexible, its degree of toughness and pliability can easily be varied, and it is of such nature that the upper and lower portions of the boot may be made integral, or may be made separate and later joined together.

Figure 1:
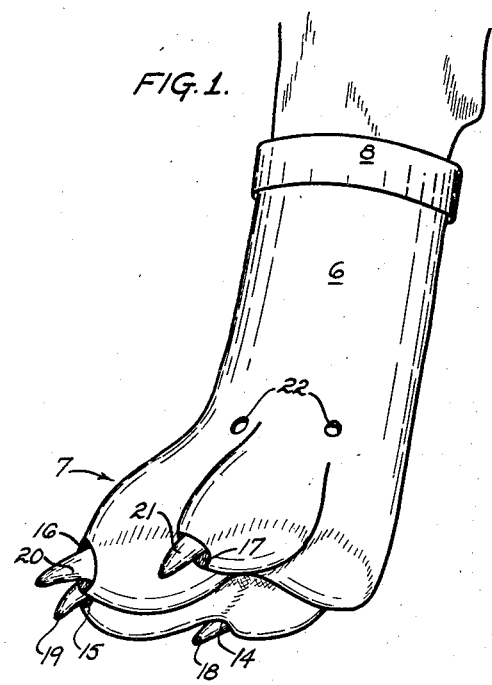
Figure 2:
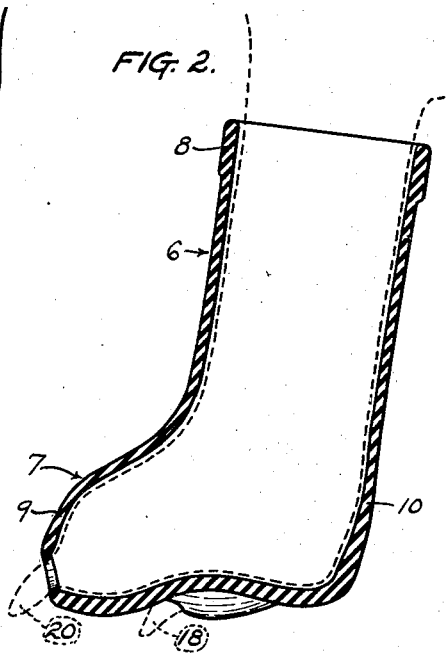
Fig. 2 is a longitudinal sectional view of the boot illustrated in Fig. 1, the foot of the animal being shown in broken lines.
Figure 3:
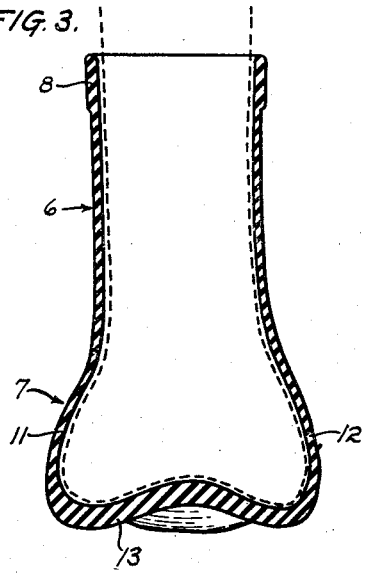
Fig. 3 is a transverse sectional view of the Fig. 1 embodiment, and further illustrates the manner in which the interior surface of the boot conforms to the shape of the animal's foot.

The sheath 6 is preferably made of relatively thin sheet rubber which is highly elastic, but tough. In Figs. 1 to 3 it will be seen that the upper edge of the sheath is preferably provided with an integral or attached strengthening band 8, to prevent tearing of the thin material. The side walls 9, 10, 11, and 12 of the foot fitting portion or socket 7 are preferably formed of the same relatively thin, tough, highly elastic rubber, possibly a little thicker than the walls of the sheath 6. The sole 13 of the socket portion 7 is of relatively thick, extremely tough, but pliable rubber.

As clearly shown in Figs. 1 to 3 inclusive, both the interior and exterior surfaces of the sole 13 are molded to conform to the anatomical structure of the bottom of the animal's foot, the shape of the mold being obtained with the foot of the animal in splayed or weight bearing condition. It will be noted that the side walls 9 to 12 inclusive of the socket portion 7 are also preferably molded to conform to the anatomical shape of the splayed foot of the animal. The sheath 6 need not be molded to exactly conform to that portion of the animal's leg immediately above the foot because the elastic character of the sheath allows it to readily conform to the shape of the leg. If the animal being fitted has protuberances or irregularities in its leg structure immediately adjacent the foot, however, the sheath portion may also be molded to allow for such irregularities.

As will be seen in Figs. 1 and 2, the socket portion 7 is provided with a plurality of small reinforced apertures 14, 15, 16, and 17, properly positioned to allow the claws or nails, 18 to 21 inclusive, to protrude from the interior of the boot. These apertures also serve to permit egress of water from the boot, in case the animal is required to swim or wade, and to permit entry of air into the boot to help maintain the animal's foot in relatively dry condition. Smaller air holes 22 may also be provided in the side walls of the socket 7 to further aid in keeping the interior of the boot dry, and to prevent the animal's foot from sweating.

Figure 4:
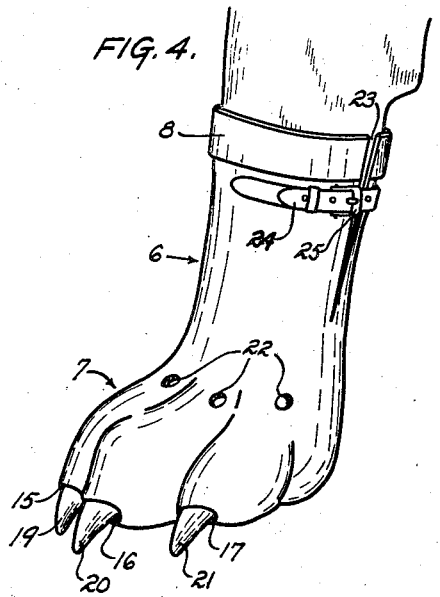
Fig. 4 is a view similar to Fig. 1, but illustrates a slightly different embodiment of the invention.

The only difference between the Fig. 4 embodiment of the invention and the embodiment illustrated in the other figures lies in the fact that this second embodiment includes a sheath which is slotted downward from its upper edge, for a desired distance to facilitate getting the boot on the animal's foot. The two sides of the slot 23, which is preferably located on the outside or at the rear of the boot, are held snugly against the leg of the animal by any suitable means, such as by a strap 24, and buckle 25.

From the above description it will be understood that I have conceived and produced a protective boot which is so constructed as to eliminate the many disadvantages attending the use of animal boots or shoes of previously known design or construction. Due to its conformity to the anatomical structure of the animal's foot, it is comfortable in use, yet does not reduce the normal foot traction of the animal nor hinder the animal in its normal movements.

While I have described and illustrated only two specific embodiments of the invention, I am aware that it may be embodied in other forms, and I do not wish to be limited except by the prior art and by the scope of the appended claims.

I claim:

1. A protective shoe or boot for claw footed animals comprising: a leg fitting sheath; a foot fitting socket, the contours of the inner surface of which closely conform to the depressions and prominences of the paw of the animal; and apertures in said socket positioned to allow the claws or nails of the animal to project therefrom for tractional contact with the earth.

2. A protective shoe or boot for claw footed animals comprising: an elastic leg fitting sheath; an elastic reinforcing band at the open upper end of the sheath for maintaining it snugly in position on the leg of the animal; a foot fitting socket the interior contours of which conform to the depressions and prominences of the paw of the animal; and apertures in said socket positioned to allow the claws of the animal to protrude therefrom for tractional contact with the earth.

3. A protective shoe or boot for claw footed animals comprising: a leg fitting sheath of highly elastic material adapted to be stretched sufficiently to afford foot entrance; and a foot fitting socket of relatively thick flexible material, the interior surface of which closely conforms to the depressions and prominences of the paw of the animal; and spaced apertures in said foot fitting socket allowing the claws or nails of the animal to project therefrom, thus affording substantially normal foot traction for the animal wearing the boot.

4. A protective shoe or boot for claw footed animals comprising: a leg fitting sheath; a foot fitting socket, the contours of the inner and outer surfaces of which closely conform to the depressions and prominences of the paw of the animal; and apertures in said socket positioned to allow the claws or nails of the animal to project therefrom for tractional contact with the earth.

5. As an article of manufacture, a protective boot for animals which have outwardly projecting nails or claws and padded feet, the leg fitting portion of said boot being formed of relatively thin highly elastic rubber sheeting, and the foot fitting portion of said boot being formed of relatively thick flexible material, both the interior and exterior surfaces of which closely conform to the depressions and prominences of the paw of the animal, said foot fitting portion being provided with suitably positoned apertures of a size to allow the claws or nails to project from the interior to the exterior thereof, whereby substantially normal foot traction is provided for the animal wearing the boot.

LON HUDDLESTON.

REFERENCES CITED

The following references are of record in the file of this patent:

UNITED STATES PATENTS

| Number | Name | Date |
| --- | --- | --- |
| 1,979,130 | Wiley | Oct. 30, 1934 |
| 2,163,361 | Ford | June 20, 1939 |
| 2,092,318 | Lindfelt | Sept. 7, 1937 |
| 1,537,778 | Nyhagen | May 12, 1925 |